United States Patent

Ryan et al.

[11] 4,293,322
[45] Oct. 6, 1981

[54] DISTILLATIVE SEPARATION OF CARBON DIOXIDE FROM HYDROGEN SULFIDE

[75] Inventors: James M. Ryan, Weston; Arthur S. Holmes, Shrewsbury, both of Mass.

[73] Assignee: Helix Technology Corporation, Waltham, Mass.

[21] Appl. No.: 143,099

[22] Filed: Apr. 23, 1980

[51] Int. Cl.³ .................................. F25J 3/00
[52] U.S. Cl. .......................................... 62/17; 62/20; 55/68; 55/73; 423/220; 423/226
[58] Field of Search .................... 62/17, 20, 23–28; 55/68, 73; 423/220, 226

[56] References Cited

U.S. PATENT DOCUMENTS

| | | | |
|---|---|---|---|
| 3,074,245 | 1/1963 | Becker | 62/17 |
| 3,320,753 | 5/1967 | Bray et al. | 62/28 |
| 3,417,572 | 12/1968 | Pryor | 62/17 |
| 3,498,067 | 3/1970 | Ranke | 62/17 |
| 3,718,006 | 2/1973 | Ranke et al. | 62/17 |
| 4,097,250 | 6/1978 | Pagani et al. | 62/17 |

*Primary Examiner*—Norman Yudkoff
*Attorney, Agent, or Firm*—Hamilton, Brook, Smith and Reynolds

[57] ABSTRACT

A distillative separation of carbon dioxide and hydrogen sulfide is improved by adding a $C_3$-$C_6$ alkane, a mixture of $C_3$-$C_6$ alkanes, $SO_2$ or $SO_3$ to a distillation column to increase the relative volatility of carbon dioxide to hydrogen sulfide. Increasing the relative volatility facilitates the separation.

2 Claims, 4 Drawing Figures

DISTILLATIVE SEPARATION OF CARBON DIOXIDE FROM HYDROGEN SULFIDE

TECHNICAL FIELD

This invention is in the field of distillation.

BACKGROUND ART

Certain gas mixtures contain both carbon dioxide and hydrogen sulfide. For example, the overhead carbon dioxide stream produced in the distillative separation of carbon dioxide from ethane described in our copending application Ser. No. 131,416, filed Mar. 18, 1980, might contain hydrogen sulfide in addition to carbon dioxide for many sources of the gas stream processed. Other sources of gas mixtures which might contain high percentages of carbon dioxide together with hydrogen sulfide are: natural occurring gas and associated gas mixtures; coal gasification or liquefaction crude gas products; and sulfur processing "tail" gases.

Recently, there has been an increased interest for certain industrial applications to resolve mixtures of carbon dioxide and hydrogen sulfide into relatively pure fractions. Many times, in enhanced oil recovery situations, for example, it is desirable to employ carbon dioxide having less than about 100 ppm hydrogen sulfide. It is also desirable to remove hydrogen sulfide from carbon dioxide streams which are vented. Relatively high purity hydrogen sulfide streams are also desired or necessary, for the production of elemental sulfur, by processes such as the Claus sulfur process.

Previously, the separation of carbon dioxide and hydrogen sulfide into two product streams, one containing carbon dioxide without a significant amount of hydrogen sulfide and one containing virtually all of the hydrogen sulfide, was difficult and extremely costly by distillative techniques. This is due to the relatively close volatilities of carbon dioxide and hydrogen sulfide at high carbon dioxide concentrations. See Bierlein, J. A. and Kay, W. B., *Industrial and Engineering Chemistry*, Vol. 45, No. 3, "Phase-Equilibrium Properties of System Carbon Dioxide-Hydrogen Sulfide", pages 618–624 (1953). Bierlein and Kay determined the phase-equilibrium properties of carbon dioxide/hydrogen sulfide systems and concluded that no azeotrope existed. Nevertheless, there was evidence that intermolecular forces of the kind causing azeotrope formation were strongly developed at the carbon dioxide-rich end of the system, together with a very flat terminal slope, which suggested a strong tendency towards formation of a minimum-boiling mixture. Based upon these data, Bierlein and Kay concluded that separation of carbon dioxide from hydrogen sulfide in the binary system became very difficult above 0.8 mole fraction of carbon dioxide, and would require a large number of theoretical stages for further separation.

These predictions are born out and the difficulty of separating carbon dioxide from hydrogen sulfide by distillation is illustrated in U.S. Pat. No. 3,417,572 issued to Pryor. In the Pryor invention, a distillation column is employed to separate a mixture of hydrogen sulfide and carbon dioxide into a hydrogen sulfide bottoms product stream and a carbon dioxide overhead product stream. Although the overhead carbon dioxide stream obtained has high purity, the bottoms product stream of hydrogen sulfide has a hydrogen sulfide concentration minimally adequate as a feed to a Claus process, which may be as little as slightly over 10 mole percent hydrogen sulfide. Even to obtain this separation, it is indicated that 100 trays were used in the distillation column.

In view of the difficult nature of complete distillative separations of carbon dioxide from hydrogen sulfide, such separations have been accomplished commercially primarily by solvent extraction techniques. Solvent extraction techniques are costly, albeit less so than prior distillative techniques.

DISCLOSURE OF THE INVENTION

This invention relates to distillative separation of carbon dioxide from hydrogen sulfide in mixtures containing both, particularly where such separations are normally difficult and/or impractical due to the low relative volatility of carbon dioxide to hydrogen sulfide at high carbon dioxide concentrations. The feed mixtures in such distillative separations can, of course, contain additional components.

In this method, a distillation column is used to separate a feed mixture containing carbon dioxide and hydrogen sulfide into an overhead stream enriched in carbon dioxide and a bottoms stream enriched in hydrogen sulfide. The improvement of this invention comprises adding to the distillation column, at a point above where the feed is introduced, an agent for increasing the relative volatility of carbon dioxide to hydrogen sulfide. Surprisingly, it has been found that certain materials, such as $C_3$-$C_6$ alkanes, produce this desired increase in relative volatility at high concentrations of carbon dioxide.

Thus, the method disclosed herein results in the ability to obtain an overhead stream enriched in carbon dioxide without a significant amount of hydrogen sulfide and a bottoms stream enriched in hydrogen sulfide in distillative separation of a mixture containing carbon dioxide and hydrogen sulfide. Additionally, since certain materials capable of increasing the relative volatility of carbon dioxide to hydrogen sulfide are often present in feed mixtures to be distilled, these can be separated and fed back to the distillation column to serve the function of increasing the relative volatilities. However, the mere presence of such materials in the feed is not sufficient to produce the required increase in relative volatility at the upper portion of a column. Agents present in the feed may be separated and added back to the column at an appropriate point, such as above the feed point, to function in the manner described herein. When this is done, advantage is taken of materials which are already present in the feed and the feed thus serves as a convenient source of agents.

BEST MODE FOR CARRYING OUT THE INVENTION

This invention will now be further described in further detail with regard to the Figures.

Much of the data presented in the following description, as well as that shown in the Figures, was obtained using a calculation program to simulate conditions within a distillation column for certain given or desired operating conditions. Unless otherwise stated, the program employed was the PROCESS simulation program of Simulation Sciences, Inc., Fullerton, Calif., Dec., 1979-Apr., 1980. Vapor-liquid equilibria and thermodynamic data were calculated based upon the Soave-Redlich-Kwong equation of state. While the total accuracy of the data obtained cannot be assured, and in fact will change somewhat depending upon the constants chosen, the data is believed to be representative of actual data and is certainly appropriate for illustrating and substantiating the benefit gained by employing an agent to raise the relative volatility of carbon dioxide to hydrogen sulfide in distillative separation. For purposes of simplifying the plots, data from systems which were not binary were plotted on a pseudobinary basis in which mole fractions are calculated as if the components beyond those in the binary were not present.

Figure 1:
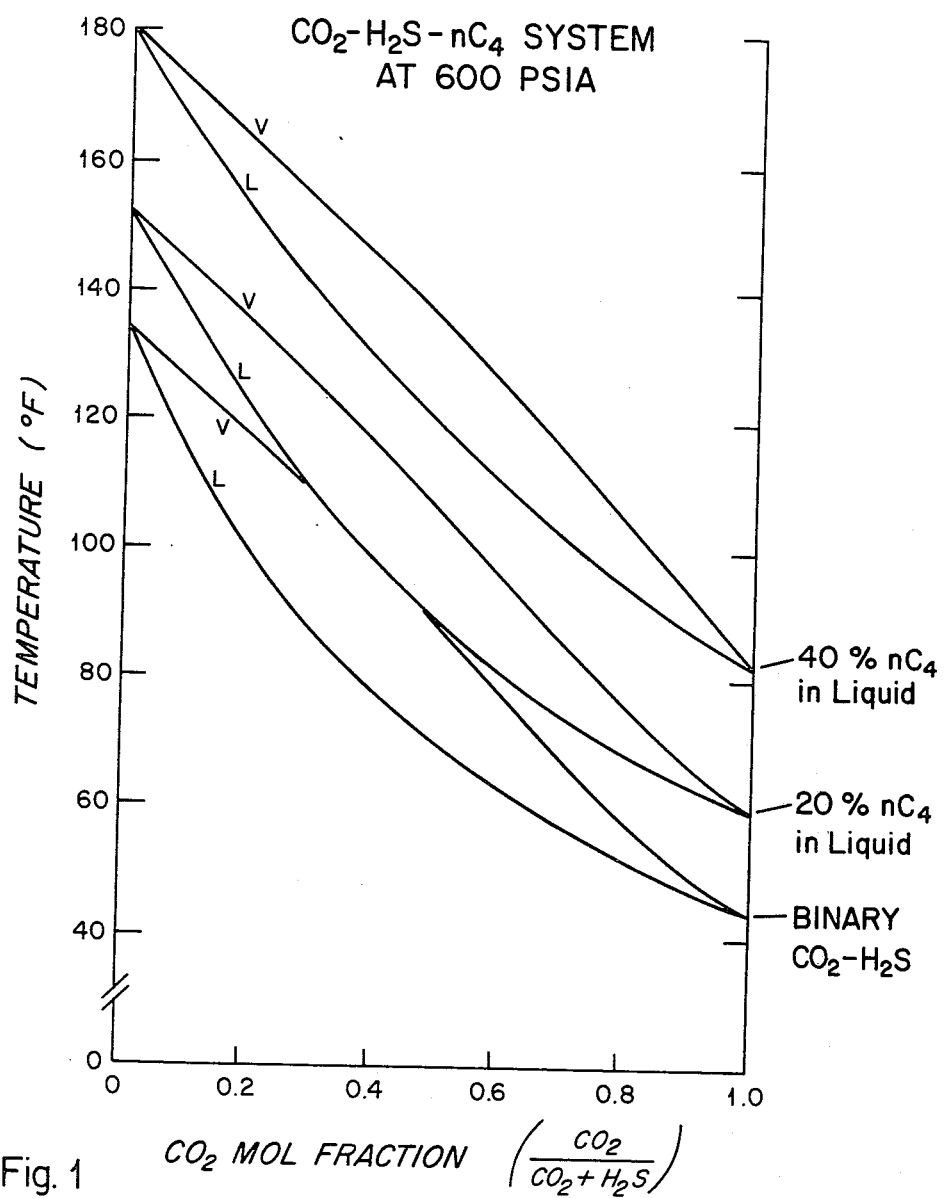
FIG. 1 is a plot of vapor-liquid equilibria data at 600 psia for the carbon dioxide/hydrogen sulfide/n-butane system containing 0, 20 and 40% n-butane in the liquid phase.

The practical difficulty of obtaining a substantially complete separation of carbon dioxide from hydrogen sulfide in a gas mixture containing both can be seen by referring to FIG. 1. Therein, it can be seen that the vapor-liquid equilibrium plot for the pure binary at 600 psia tends to pinch together at the high carbon dioxide concentrations. Once a composition containing about 80% carbon dioxide has been reached, further separation is very difficult. Thus, the overhead product from a column would normally be limited to about 80% carbon dioxide, unless a large number of theoretical stages is added to the column. The beneficial effect of adding an agent to increase the relative volatility of carbon dioxide to hydrogen sulfide can be seen in FIG. 1, also. When n-butane is added to a concentration of 20% in the liquid phase, the right hand portion of the vapor-liquid plot is opened considerably making further separation much easier. Further opening of the vapor-liquid equilibria plot is illustrated when n-butane is added to a concentration of 40% in the liquid phase.

Figure 2:
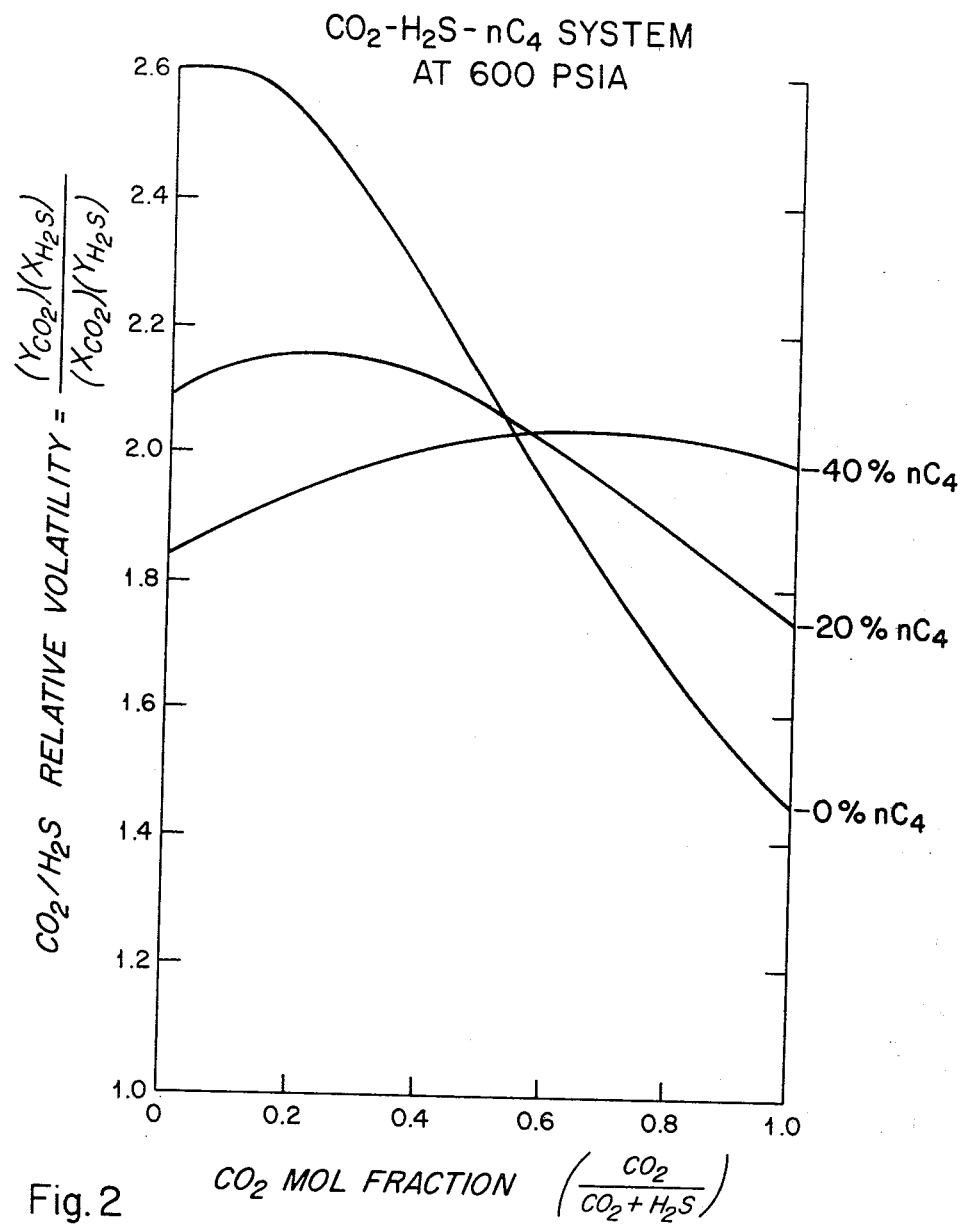
FIG. 2 is a plot of the relative volatility of carbon dioxide to hydrogen sulfide at 600 psia in systems containing 0, 20 and 40% n-butane in the liquid phase, plotted against liquid-phase composition.

The beneficial effect of the agent is more dramatically demonstrated by the data regarding the relative volatility of carbon dioxide to hydrogen sulfide presented in FIG. 2. As illustrated, with no agent present, the relative volatility approaches 1.45 at high concentrations of carbon dioxide. The addition of n-butane to a level of 20% in the liquid phase significantly raises the relative volatility, and addition of n-butane to a level of 40% raises it even further.

Figure 3:
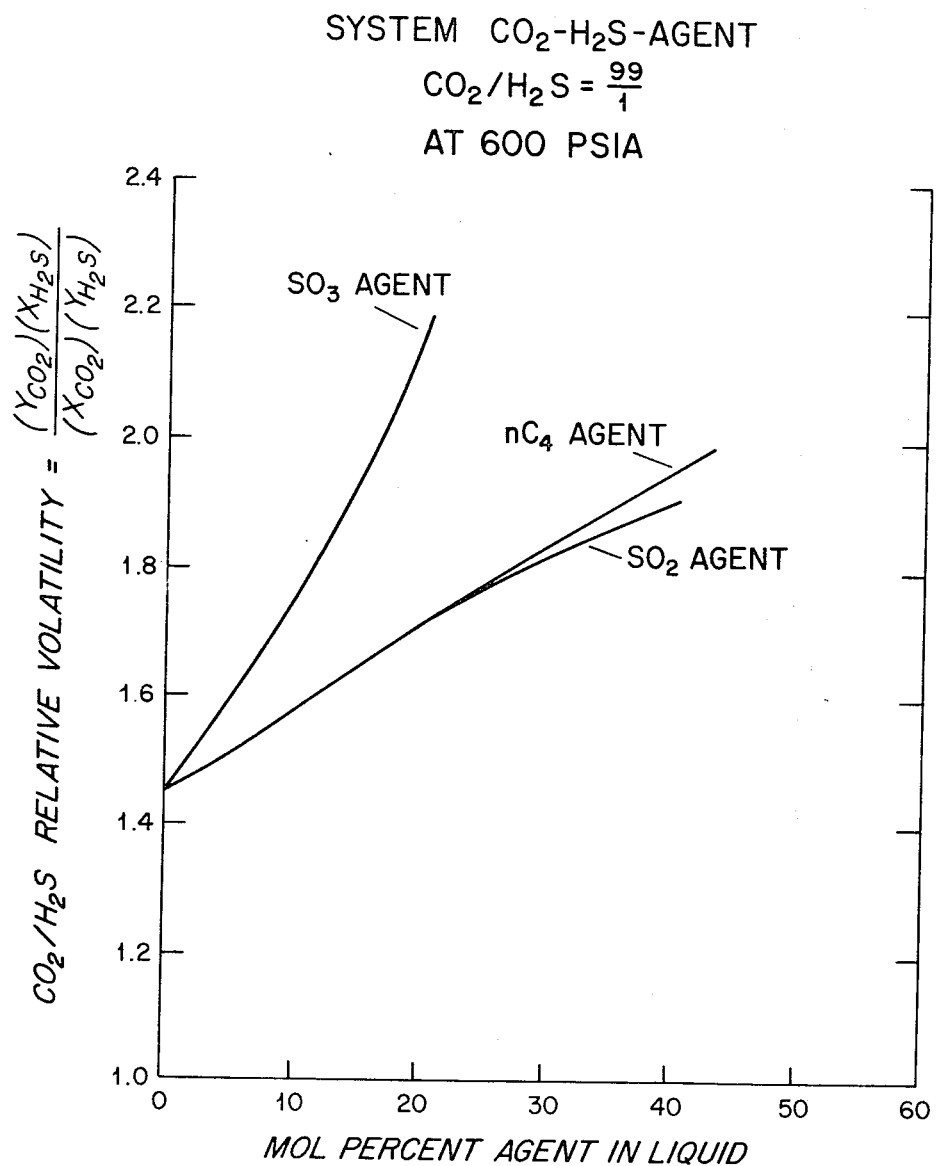
FIG. 3 is a plot of the relative volatility of carbon dioxide to hydrogen sulfide in three different systems containing either n-butane, sulfur dioxide or sulfur trioxide at 600 psia, plotted against mole percent agent in the liquid phase; and, FIG. 4 is a schematic flow diagram illustrating apparatus suitable for carrying out the invention described herein.

FIG. 3 compares the effect of three potential agents on the relative volatility of carbon dioxide to hydrogen sulfide. It can be seen that sulfur dioxide and n-butane have a similar effect up to about 22% agent. Above this amount, n-butane has a slightly larger effect on relative volatility than sulfur dioxide. Sulfur trioxide exhibits a greater effect on relative volatility than both n-butane and sulfur dioxide at the concentrations shown.

Of course, considerations beyond the effect of agents on relative volatility must be considered in selecting agents. For example, the potential for reactions between the agent and components in the mixture to be separated should be considered, as should the ease of separating the agent from hydrogen sulfide if such separations are desired or necessary in subsequent processing of the bottoms stream.

In general, a wide variety of materials or mixtures of materials which cause the relative volatility of carbon dioxide to hydrogen sulfide to be significantly increased over the range of interest is satisfactory as an agent for this invention. Agents which are components in the feed mixture are preferred agents because they are easy to separate and recycle and often have a very beneficial effect in causing the carbon dioxide to be more volatile relative to hydrogen sulfide. Natural gas liquids (NGL) contain alkanes, such as $C_3$-$C_6$ alkanes, which can often be separated from bottoms product in conventional separation equipment. Thus, NGL or components thereof can be conveniently recycled to provide a beneficial agent. It is also clear that materials satisfactory as an agent need not be pure materials. In general, the agent should be miscible in the liquid phase at all conditions in the distillation column. It is desirable, of course, to have agents which have volatilities lower than the components to be separated. Also, the agent should have a freezing point sufficiently low to avoid solids formation in the column.

In addition to the preferred materials mentioned above, there are other classes of materials which meet these requirements. For example, other hydrocarbons such as higher alkanes and naphthenes, halogenated hydrocarbons such as fluoro-chloromethane and fluoro-chloroethane compounds, sulphur dioxide, sulfur trioxide, etc., are believed to be suitable. Those skilled in the art will know, or be able to ascertain using no more than routine experimentation, other suitable agents for use with the invention described herein.

The amount of agent added will be dependent upon factors such as the composition of the feed, operating pressure, throughput of the column, recovery of overhead and bottoms product desired, etc. Such factors can be taken into account by those skilled in the art by determining the operative amounts for any given separation using no more than routine experimentation.

Agent is added to the tower at a point above where feed is introduced since this is where relative volatility needs to be increased. Although some materials which are suitable agents are contained in the feed in some cases, this alone is not sufficient. This is because the agent is usually not sufficiently volatile to rise up the column to the problem area in sufficient concentration. Thus, even if present in the feed, the agent should be separated and added to a point above the feed.

Although it is possible to add agent to the top of the column, including into the condenser, this is usually not desirable because agent cannot then be separated efficiently from overhead product. Thus, it is preferable to add agent in most cases at a point below the column top to thereby allow separation of additive from the desired overhead product.

In some cases, it is desirable to add agent at more than one column location on a simultaneous basis.

Figure 4:
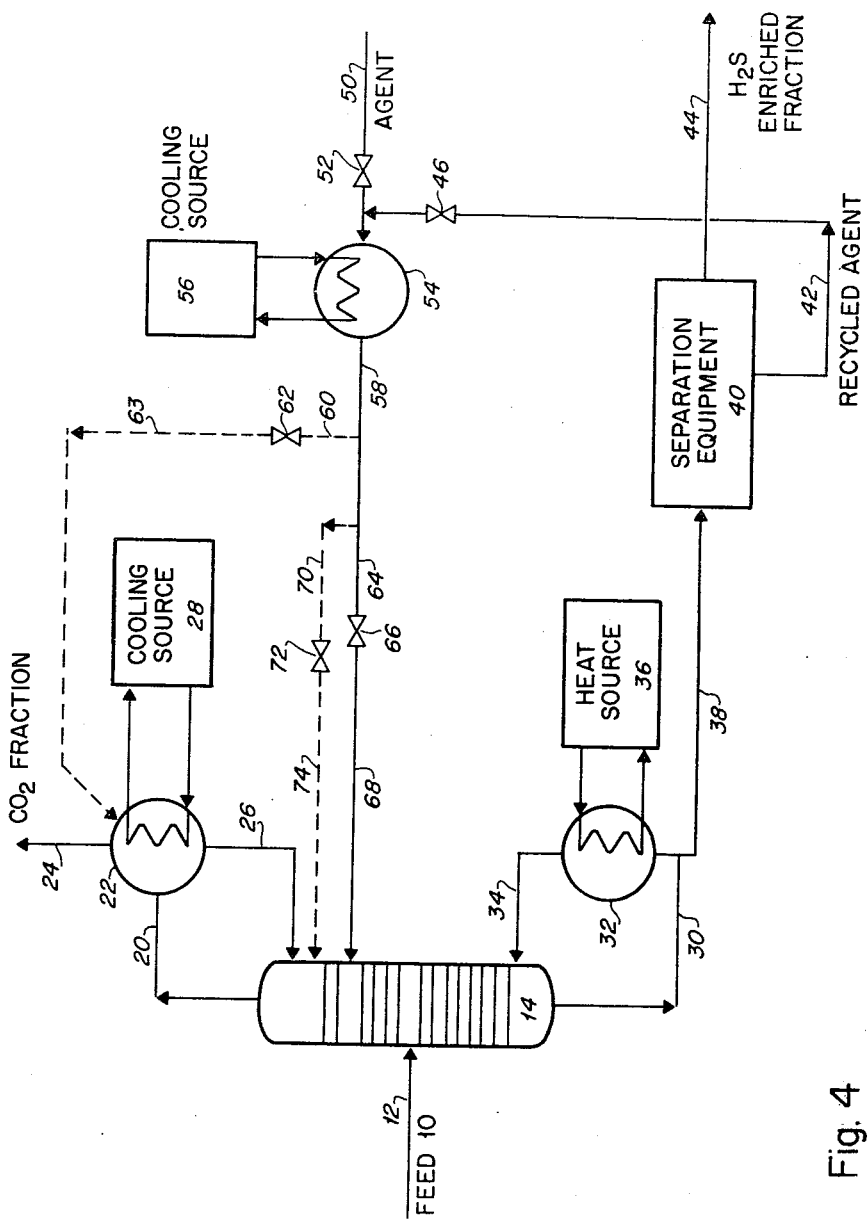

An apparatus for carrying out a separation of carbon dioxide from hydrogen sulfide according to this invention is schematically illustrated in FIG. 4. Therein, feed mixture 10, containing a mixture of carbon dioxide and hydrogen sulfide, and usually other components such as hydrocarbons, nitrogen, etc., enters through feed line 12 into distillation column 14. Column 14 contains a number of vapor-liquid contact devices such as trays or packing, with the exact number of contact stages depending upon the required operating conditions.

Overhead stream 20 is rich in carbon dioxide and passes to partial condenser 22 from which the remaining vapor stream 24 exits as carbon dioxide product. This product stream also contains, of course, components present in the feed which are more volatile than carbon dioxide, such as any hydrogen, carbon monoxide, nitrogen and light hydrocarbons present in the feed. Liquid from the partial condenser returns to column 14 in line 26 where it serves as reflux for tower 14. Condenser 22 is cooled by external cooling source 28.

The bottoms stream exits from the lower portion of column 14 in bottoms line 30 and contains hydrogen sulfide and other less volatile hydrocarbons or other components, and any agent added to increase carbon dioxide/hydrogen sulfide relative volatility. A portion of the bottoms product is passed through reboiler 32 and back to column 14 in line 34. Reboiler 32 is heated by an external heat source 36.

The bottoms product passes in line 38 to further separation equipment 40, such as another distillation column. Separation equipment 40 is employed to separate out the agent which is recycled in line 42 back to the column. The amount of recycled agent can be controlled by valve 46. An hydrogen sulfide fraction is also separated in equipment 40 and is directed in line 44 to suitable hydrogen sulfide product facilities.

Agent for increasing the relative volatility of carbon dioxide may also be added to the system through line 50 and valve 52. Such externally added agent may be used in lieu of recycled agent or in conjunction with recycled agent. In either case, the agent is cooled in heat exchanger 54, cooled by cooling source 56, and directed through flow line 58 back towards the column 14.

Agent can be added at a number of different location, either individually or at several locations simultaneously. As illustrated, agent can be directed in line 64 to valve 66 and flow line 68 and introduced directly onto a tray in the upper section of column 14. Similarly, agent can be added to a higher column tray, such as by passing it in line 70 through control valve 72 and line 74. Agent can also be introduced into condenser 22 by directing agent through line 60, flow control valve 62 and line 63. Other suitable points of addition can be determined, of course, for each particular separation being performed.

INDUSTRIAL APPLICABILITY

This invention is useful in the distillative separation of carbon dioxide from hydrogen sulfide.

EQUIVALENTS

Those skilled in the art will recognize, or be able to determine using no more than routine experimentation, other equivalents to the specific embodiments described herein.

I claim:

1. In a separation of carbon dioxide from hydrogen sulfide in a distillation column, the improvement of adding an agent for raising the relative volatility of carbon dioxide to hydrogen sulfide to said column at a point above the feed, said agent comprising a $C_3$-$C_6$ alkane, a mixture of $C_3$-$C_6$ alkanes, $SO_2$ or $SO_3$.

2. A method for separating carbon dioxide from a mixture containing carbon dioxide and hydrogen sulfide, comprising:
   a. introducing said mixture into a distillation column containing a plurality of vapor-liquid contact devices;
   b. operating said distillation column at conditions of pressure, temperature and composition sufficient to produce an enriched carbon dioxide overhead stream and an enriched hydrogen sulfide bottoms stream; and,
   c. introducing into said distillation column at a location above the feed point thereof a $C_3$-$C_6$ alkane or mixture of $C_3$-$C_6$ alkanes, to thereby increase the relative volatility of carbon dioxide to hydrogen sulfide.

* * * * *